United States Patent Office 3,574,684

Patented Apr. 13, 1971

3,574,684

POLYURETHANE MAGNETIC COATING COMPOSITION

Louis M. Higashi, San Jose, Calif., assignor to Memorex Corporation, Santa Clara, Calif.

No Drawing. Filed May 26, 1965, Ser. No. 459,074
The portion of the term of the patent subsequent to Nov. 19, 1985, has been disclaimed
Int. Cl. H01f *10/02*
U.S. Cl. 117—237 4 Claims

ABSTRACT OF THE DISCLOSURE

A polyurethane magnetic coating composition for recording tape comprising a magnetic pigment in a thermosetting binder made from a low molecular weight diol, a high molecular weight polyester diol having a molecular weight between 10,000 and 30,000 and a triisocyanate.

This invention relates to magnetic recording media and more particularly to a magnetic recording media and method of producing the same in which a magnetic pigment is dispersed and supported in a reactive polyurethane binder system.

Magnetic recording media are generally formed by dispersing magnetically susceptible particles such as gamma ferric oxide which has a spinelle lattice structure in a suitable polymeric binder solution, and coating this dispersion upon a flexible substrate such as paper, cellophane, films of polyvinylchloride, polyethylene or polyester film or rigid substrates such as glass, metal or plastic plates.

With the development of more precise and higher speed magnetic recording and playback equipment, it has become a common object in the art to produce more durable coatings that have less tendency to shed binder and magnetic particles. Such coatings are known by those skilled in the art to maintain optimum signal output over longer periods of operation and are known to have less tendency to develop signal "dropouts" which are localized signal loss areas on the surface of magnetic tape.

A further object of this art is the development of magnetic coatings which possess the necessary flexibility without the incorporation of plasticizers and elastomers. The presence of such agents was often found to create problems of incompatibilities in the binder system as well as lead to blocking tendencies of the coating in environments of higher relative humidities and storage temperatures. Blocking is the tendency of the coating to adhere to the back of the flexible substrate when magnetic tape is stored under tension under adverse environmental conditions.

In accordance with this invention, a novel magnetic recording media is produced in which a magnetic pigment is dispersed in a polyurethane binder system where the polyurethane binder system is reacted after dispersing the magnetic pigment therein. The practice of this invention leads to a durable magnetic recording media of low debris formation, improved abrasion resistance, and storage stability under adverse environmental conditions.

The reactive polyurethane binder system employed in accordance with this invention is a reactive mixture of a low molecular weight diol, a high molecular weight diol, and a triisocyanate. The low molecular weight diol forms from about 10 to 90 weight percent of the mixture of the two diols with the lower percentages being employed for the lower molecular weight diols, and the amount of triisocyanate is selected to give a ratio of isocyanate groups to hydroxyl groups in the mixture which is within the range of 0.8 to 1.5, and preferably about 1.25.

The low molecular weight diol may be a primary or secondary aliphatic glycol containing 2 to 22 carbon atoms, a polyether glycol containing 4 to 22 carbon atoms or a polyester diol having a hydroxyl number of 10 to 100 and having the following general structure:

$$HO-[R\,O-\overset{O}{\overset{\|}{C}}-\overset{|}{R}-\overset{O}{\overset{\|}{C}}-O-R-]_n-OH$$

where R is the carbon chain of a glycol represented by $$-(CH_2)_2-$$
$$-(CH_2)_3-$$
$$-CH_2\underset{\underset{CH_3}{|}}{CH_2}-$$
$$-CH_2CH_2OCH_2CH_2-$$

and R′ is an aliphatic hydrocarbon radical containing about 6 to 16 carbon atoms, and *n* is an integer having a value such that the molecular weight of the low molecular weight polyester diol is 216 to 3240.

The high molecular weight diol may be a polyester having a hydroxyl number of 1 to 40 and having the following general formula:

$$HO-[(CH_2CH_2)_xO\overset{O}{\overset{\|}{C}}R\overset{O}{\overset{\|}{C}}O(CH_2CH_2)_xO\overset{O}{\overset{\|}{C}}R'\overset{O}{\overset{\|}{C}}O(CH_2CH_2)_x]_nOH$$

where R is a benzene ring, in the ortho, meta, or para configuration, R′ is an aliphatic hydrocarbon radical containing about 6–16 carbon atoms, *x* is an integer from 7 to 30, and *n* is an integer having a value such that the molecular weight of the high molecular weight polyester is approximately 10,000 to 30,000.

The triisocyanate may be triphenyl methane triisocyanate, or a prepolymer having the general formula:

$$C_2H_5C(CH_2O\overset{O}{\overset{\|}{C}}\overset{H}{\overset{/}{N}}RNCO)_3$$

where R is a divalent benzene radical containing an aliphatic hydrocarbon side chain of 0 to 18 carbon atoms.

In accordance with the method of this invention, a mixture is prepared containing the desired amount of magnetic pigment, the desired amount of low molecular weight diol, and the desired amount of the high molecular weight diol, and there may be incorporated into the mixture a solvent which is free of reactive hydroxyl and isocyanate groups. Also there is incorporated into the mixture a catalytic amount of a catalyst such as triethylene diamine, methyl amine, triethanol amine, urea, lead octoate, dibutyltin dilaurate, and metal acetylacetonates.

The mixture of magnetic pigment, low molecular weight diol, and high molecular weight diol containing the catalyst and solvent if desired is mixed to uniformity for instance in a paint ball mill for a period of 10 to 20 hours, and thereafter the triisocyanate is added to the mixture. In this regard, it should be noted that advantages in the shelf life of the mixture after the triisocyanate has been added are obtained where the aromatic group in the triisocyanate (the group R mentioned above in the formula) contains the alkyl side chain of at least one carbon atom as a substituent on the benzene ring adjacent to the reactive isocyanate group.

The components of the recording media are preferably employed in the following amounts, the parts given being parts by weight: where the low molecular weight diol is the polyester base diol, 4–10 parts of the low molecular weight diol are employed with 60–85 parts of magnetic powder, 10–27 parts of the high molecular weight diol, 1–3 parts of the prepolymer triisocyanate, 50–80 parts of keytone solvent, and 0.05 to 1.0 part of triethylene amine, and the low molecular weight diol forms 20 to 80 percent of the combined weight of the low molecular weight diol and high molecular weight diol. Where the low molecular weight glycol or the polyether glycol is employed as the low molecular weight diol, 60 to 80 parts of magnetic powder are employed with 0.7 to 1.9 parts of the low molecular weight glycol, and 10.0 to 26.6 parts of the high molecular weight polyester diol, 9.3 to 11.5 parts of the prepolymer triisocyanate 50–80 parts of keytone and 0.05 to 1.0 part of dibutyltin dilaurate.

The following specific examples are set forth for the purpose of illustrating the practice of the invention. Many variations and modifications of these examples will be apparent to those skilled in the art and may be made without departing from the spirit and scope of the invention.

EXAMPLES 1–3

In these examples, the magnetic pigment employed was moisture free gamma ferric oxide. The low molecular weight polyester diol was Multron R16, made by Mobay Chemical Company. This polyester is based on diethylene glycol and adipic acid and has a molecular weight of approximately 2550 and a hydroxyl number of 44.0. The high molecular weight polyester, having a molecular weight of approximately 20,000 and a hydroxyl number of 2.75 was Vitel PE207. This polyester is a product of the Goodyear Chemical Company and is a prepolymer of polyethylene glycol terephthalate and sebacate. The triisocyanate prepolymer was a product sold by Spencer Kellogg Company under the trademark P49–60X and consists of an adduct of one mole of trimethylol propane and three moles of toluene-2,4-diisocyanate prepared as a 60% solids solution in a 50–50 blend of Cellosolve acetate and xylene. Mondur CB60 sold by Mobay Chemical Company and Tranco 375B sold by Trancoa Chemical Company are equivalents.

The 49000 series of Du Pont polyesters having a hydroxyl number of 11 may be used in lieu of Vitel PE207 as well as Goodyear Chemical's Vitel PE100 and Vitel PE200.

Witco Chemical's Foamrez #50 with a hydroxyl value of 52 may be equivalent to Multron R16.

A 20% solution of triphenyl methane triisocyanate in monochloro benzene and having 6.8% free isocyanate content may be used instead of P49–60CX. This prepolymer is manufactured and sold by Mobay Chemical Company under the trademark of Modur TM.

The following amounts given in parts by weight of the above identified materials were employed for making the magnetic layer for a magnetic tape, and the magnetic media thus produced were applied to a Mylar substrate in conventional manner, and the wet coatings were cured at 300° F. for three minutes.

| | Examples | | |
|---|---|---|---|
| | 1 | 2 | 3 |
| Ingredients, parts by weight: | | | |
| Magnetic pigment | 75.00 | 75.00 | 75.00 |
| Polyester diol | 7.65 | 11.23 | 7.65 |
| Polyester (30% in cyclohexanone) | 71.00 | 56.00 | 71.00 |
| 5% ferric acetylacetonate | 4.85 | 4.85 | ------- |
| Dibutyltin dilaurate | ------- | ------- | 0.24 |
| 60% P49–60CX prepolymer | 3.97 | 5.40 | 3.97 |
| Cychohexanone solvent | 90.00 | 99.99 | 94.61 |
| Variables of Examples 1–3: | | | |
| NCO/OH | 1.25 | 1.25 | 1.25 |
| Low molecular weight diol/total diol (in percent) | 26.5 | 40.0 | 26.5 |
| Percent pigment in total media | 70.4 | 70.4 | 70.4 |
| Catalyst level on binder, percent | 0.77 | 0.77 | 0.77 |

EXAMPLES 4–7

In these examples the preparation of the magnetic media was repeated in a similar way but employing pentanediol 1,5 as the low molecular weight diol. This low molecular weight diol has a hydroxyl number of 1076 and is the preferred low molecular weight glycol for use in this invention. The lower molecular weight diols yield tough, less flexible magnetic coatings of greater hardness while the higher molecular weight diols such as polyethylene and polypropylene glycols yield more flexible, softer coatings which are more elastomeric in nature.

The following is a list of alternate diols sold by Union Carbide Company which may be employed, and similar materials are supplied by various manufacturers and may be freely substituted:

ethylene glycol
diethylene glycol
triethylene glycol
tetraethylene glycol
propylene glycol
dipropylene glycol
1,3 propane diol
polypropylene glycols such as Niax PPG Nos. 425, 1025, 2025, 3025, 4025, Niax LG Nos. 56, 168
2-methyl-2-ethyl-1,3 propanediol
2-ethyl-1,3-hexandiol
hexylene glycol other diols which may be used include butynediol and butenediol, a product of Antara Chemical Company and polyethylene glycols varying in molecular weight from 238 to 6,000 which are sold by the Jefferson Chemical Company. The following formulations were employed for making magnetic recording media, and these media were coated on Mylar films in conventional ways, and the wet coatings were cured at 300° F. for three minutes.

| | Examples | | | |
|---|---|---|---|---|
| | 4 | 5 | 6 | 7 |
| Ingredients, parts by weight: | | | | |
| Magnetic pigment | 75.00 | 75.00 | 75.00 | 75.00 |
| Pentanediol 1,5 | 1.43 | 1.92 | 0.77 | 1.65 |
| Polyester (30% in cyclohexanone) | 70.80 | 57.50 | 82.70 | 81.80 |
| 5% ferric acetylacetonate | 5.00 | 5.00 | 5.00 | 5.00 |
| 60% P49–60CX prepolymer | 15.20 | 21.05 | 10.30 | ------ |
| 20% Mondur TM prepolymer | ------ | ------ | ------ | 27.60 |
| Cyclohexanone solvent | 100.00 | 106.96 | 93.66 | 76.40 |
| Variables of Examples 4–7: | | | | |
| NCO/OH | 1.25 | 1.25 | 1.25 | 1.25 |
| Low molecular weight diol/total diol (in percent) | 6.3 | 10. | 3. | 6.3 |
| Percent pigment in total media | 70. | 70. | 70. | 70. |
| Catalyst level on binder, percent | 0.78 | 0.78 | 0.78 | 0.78 |

The tapes prepared in these preceding examples were subjected to standard magnetic tape tests and in these tests were compared to a high quality precision magnetic tape which employs a vinyl binder system made of a non-reactive mixture of a fully reacted polyurethane and a copolymer of vinylidene chloride acrylonitrile.

The results of standard magnetic tape tests on the tapes of the preceding examples are reported in the following table. In these tests, taber abrasion measurements are expressed as milligrams of coating lost when the tape was subjected to the abrasion action of two #CS10 abrasive wheels at 1000 grams pressure for 500 r.p.m. The blocking tests were run by winding three feet of ½ inch wide magnetic tape around a ¼ inch diameter metal shaft under 15 pounds tension and exposing the wound tape to 160° F. and 84% relative humidity for 16 hours and then conditioning the tape under ambient conditions for 24 hours prior to unwinding.

| Test | 1 | 2 | 3 | 4 | 5 | 6 | 7 | Vinyl |
|---|---|---|---|---|---|---|---|---|
| Neck down | A | A | A | A | A | A | A | A |
| Roll | A | A | A | A | F | A | A | A |
| Peel | A | A | A | F | F | A | A | B |
| Pencil hardness | H+ | H+ | HB+ | H | 2H | H+ | HB | HB |
| Taber mg. loss | 32.0 | 48.5 | 30.0 | 18.5 | 23.0 | 36.5 | 48.0 | 50 |
| Ketone resistance | A | A | A– | A | B | B | A | F |
| Mar resistance | A | A | A | A | A | A | A | B |
| Wrinkle | A | A | A | A | C– | A | A– | C |
| Oxide loading (g./cc.) | 1.76 | 1.74 | 1.84 | ------ | ------ | ------ | ------ | 1.56 |
| 160° F. blocking | (1) | (1) | (2) | (1) | (1) | (1) | (1) | (3) |
| Melting point, °C | 205 | 205 | 205 | 220 | 220 | 220 | 220 | 150 |

1 Pass 100%.
2 Pass 50%.
3 Pass 80%.

The melting point of the polyurethane coatings was 205° C. and above as compared to 150° C. for the vinyl system. Due to this higher melting point such coatings were superior in performance when subject to high frictional heat generated on the surface when used on high speed tape transports. The tapes were tested on a commercial video tape recorder where the tape was held stationary against the high speed revolving helical scanner, and no signal dropouts were observed on the polyurethane tape of this invention for 2100 seconds while the vinyl coating lasted only 300 seconds. Also, the same polyurethane coating of this invention was dropout free of over 3,000,000 cycles when tested on the revolving drum of a random access type of memory storage device compared to only several cycles for the vinyl system.

While certain specific operative examples of this invention have been described in detail herein, it is obvious that many modifications thereof may be made without departing from the spirit and scope of the invention.

I claim:

1. A magnetic recording media which comprises a support means, and a magnetic pigment dispersed in a polyurethane binder coated on said support means where said binder comprises:

(A) a low molecular weight diol selected from the class consisting of primary and secondary aliphatic glycols containing 2 to 22 carbon atoms, polyether glycols containing 4 to 22 carbon atoms and polyester glycols having a hydroxyl number of 10 to 100 and having the following general formula $$HO-[R-O-\overset{O}{\overset{\|}{C}}-R'-\overset{O}{\overset{\|}{C}}-O-R-]_n-OH$$

where R is the carbon chain of a glycol represented by $$-(CH_2)_2-$$
$$-(CH_2)_3-$$
$$-CH_2\underset{CH_3}{\underset{|}{C}}H_2-$$
$$-CH_2CH_2OCH_2CH_2-$$

and R' is an aliphatic hydrocarbon radical containing about 6 to 16 carbon atoms, and $n$ is an integer having a value such that the molecular weight of the low molecular weight polyester diol is 216 to 3240, (B) a high molecular weight diol having a hydroxyl number of 1 to 40 and having the following general formula $$HO[(CH_2CH_2)_xO\overset{O}{\overset{\|}{C}}R\overset{O}{\overset{\|}{C}}O(CH_3CH_2)_xO\overset{O}{\overset{\|}{C}}R'\overset{O}{\overset{\|}{C}}O(CH_2CH_3)_x]_nOH$$

where R is a benzene ring, in the ortho, meta, or para configuration, R' is an aliphatic hydrocarbon radical containing about 6–16 carbon atoms, X is an integer from 7 to 30, and $n$ is an integer having a value such that the molecular weight of the high molecular weight polyester is approximately 10,000 to 30,000, (C) a triisocyanate selected from the class consisting of triphenyl methane triisocyanate and a prepolymer having the general formula $$C_2H_5C(CH_2O\overset{O}{\overset{\|}{C}}\overset{H}{N}RNCO)_3$$

where R is a divalent benzene radical containing an aliphatic hydrocarbon side chain of 0 to 18 carbon atoms, (D) with said low molecular weight diol, said high molecular weight diol, and said triisocyanate chemically reacted together, (E) the low molecular weight diol forming from about 10 to about 90 weight percent of said two diols, and (F) said triisocyanate being present in an amount to contribute to said binder 0.8 to 1.5 mols of active isocyanate groups per mol of active hydroxyl groups contribtued by said two diols.

2. A magnetic recording media which comprises:

(A) 60–85 parts by weight of magnetic particles, and (B) a polymeric binder for said particles containing chemically reacted together, (1) 4–10 parts by weight of diethylene glycol adipate having a molecular weight of about 2550 and a hydroxyl number of about 44, (2) 10–27 parts by weight of polyethylene glycol terephthalate sebacate having a molecular weight of about 20,000 and a hydroxyl number of about 2.75, and (3) 1–3 parts by weight of an adduct of one mol of trimethylol propane and three mols of toluene-2,4 diisocyanate.

3. A magnetic recording media which comprises:

(A) 60–80 parts by weight of magnetic particles, and (B) a polymeric binder for said particles containing chemically reacted together, (1) 0.7–1.9 parts by weight of propanediol-1,5, (2) 10.0 to 26.6 parts by weight of polyethylene glycol terephthalate sebacate having a molecular weight of about 20,000 and a hydroxyl number of about 2.75, and (3) 9.3 to 11.5 parts by weight of an adduct of one mole of trimethylol propane and three mols of toluene-2,4-diisocyanate.

4. A method of making a magnetic recording media which comprises:

(A) forming a mixture containing (1) a magnetic pigment, (2) a low molecular weight diol selected from the class consisting of primary and secondary aliphatic glycols containing 2 to 22 carbon atoms, polyether glycols containing 4 to 22 carbon atoms and polyester glycols having a hydroxyl number of 10 to 100 and having the following general formula $$HO-[R-O-\overset{O}{\overset{\|}{C}}-R'-\overset{O}{\overset{\|}{C}}-O-R-]_nOH$$

where R is the carbon chain of a glycol represented by $$-(CH_2)_2-$$
$$-(CH_2)_3-$$
$$-CH_2\underset{CH_3}{\underset{|}{C}}H_2-$$
$$-CH_2CH_2OCH_2CH_2-$$

and R' is an aliphatic hydrocarbon radical containing about 6 to 16 carbon atoms, and $n$ is an integer having a value such that the molecular weight of the low molecular weight polyester diol is 216 to 3240, (3) a high molecular weight diol having a hydroxyl number of 1 to 40 and having the following general formula $$HO-[(CH_2CH_2)_xO\overset{C}{\overset{\|}{C}}R\overset{O}{\overset{\|}{C}}O(CH_2CH_2)_xO\overset{O}{\overset{\|}{C}}R'\overset{O}{\overset{\|}{C}}O(CH_2CH_2)_x]_nOH$$

where R is a benzene ring, in the ortho, meta, or para configuration, R' is an aliphatic hydrocarbon radical containing about 6–16 carbon atoms, X is an integer from 7 to 30, and $n$ is an integer having a value such that the molecular weight of the high molecular weight polyester is approximately 10,000 to 30,000

(4) with said low molecular weight diol forming about 10 to about 90 weight percent of the combined weights of said two diols, (B) mixing said mixture until said mixture is substantially homogeneous, (C) adding to said mixture a triisocyanate selected from the class consisting of triphenyl methane triisocyanate and a prepolymer having the general formula $$C_2H_5C(CH_2O\overset{\overset{\displaystyle O}{\|}}{C}\overset{H}{N}RNCO)_3$$

where R is a divalent benzene radical containing an aliphatic hydrocarbon side chain of 0 to 18 carbon atoms with the amount of said triisocyanate being sufficient to provide in said mixture 0.8 to 1.5 mols of active isocyanate groups per mol of active hydroxyl groups in said mixture, (D) coating said mixture on a supporting surface, and (E) reacting said triisocyanate with said diols.

References Cited

UNITED STATES PATENTS

| | | | |
|---|---|---|---|
| 3,150,995 | 9/1964 | Baur | 117—235UX |
| 3,164,572 | 1/1965 | Axelrood | 260—77.5 |
| 3,216,846 | 11/1965 | Hendricx et al. | 252—62.54 |
| 3,234,182 | 2/1966 | Seeburger et al. | 260—77.5X |
| 3,351,573 | 11/1967 | Skreckoski | 117—161X |
| 3,357,855 | 12/1967 | Bisschops et al. | 117—121X |
| 3,366,505 | 1/1968 | Bisschops et al. | 117—121X |
| 2,511,310 | 6/1950 | Upson | 26—46.5 |
| 2,901,467 | 8/1959 | Croco | 117—148X |
| 3,320,090 | 5/1967 | Graubart | 117—138.8X |
| 3,411,944 | 11/1968 | Higashi | 117—121 |

WILLIAM D. MARTIN, Primary Examiner

B. D. PIANALTO, Assistant Examiner

U.S. Cl. X.R.

117—161, 235; 252—62.54; 260—2.5, 75., 77.5